(12) United States Patent
Fucke et al.

(10) Patent No.: US 7,380,749 B2
(45) Date of Patent: Jun. 3, 2008

(54) COMBINED FUEL CELL AIRCRAFT AUXILIARY POWER UNIT AND ENVIRONMENTAL CONTROL SYSTEM

(75) Inventors: Lars Fucke, Kirkland, WA (US); David L. Daggett, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 26 days.

(21) Appl. No.: 11/112,689

(22) Filed: Apr. 21, 2005

(65) Prior Publication Data
US 2006/0237583 A1    Oct. 26, 2006

(51) Int. Cl.
*B64D 41/00* (2006.01)
*B64D 13/00* (2006.01)

(52) U.S. Cl. .................. 244/58; 244/118.5; 429/12; 429/20; 60/39.511

(58) Field of Classification Search .............. 244/58, 244/53 R, 118.5
See application file for complete search history.

(56) References Cited

U.S. PATENT DOCUMENTS

| | | | |
|---|---|---|---|
| 4,261,416 A | | 4/1981 | Hamamoto |
| 4,419,926 A | | 12/1983 | Cronin et al. |
| 4,523,517 A | | 6/1985 | Cronin |
| 4,546,939 A | | 10/1985 | Cronin |
| 5,106,035 A | * | 4/1992 | Langford, III ............... 244/59 |
| 5,125,597 A | | 6/1992 | Coffinberry |
| 5,143,329 A | | 9/1992 | Coffinberry |
| 5,145,124 A | | 9/1992 | Brunskill et al. |
| 5,299,763 A | | 4/1994 | Bescoby et al. |
| 5,413,879 A | * | 5/1995 | Domeracki et al. ........... 429/30 |
| 5,442,905 A | | 8/1995 | Claeys et al. |
| 5,482,229 A | | 1/1996 | Asshauer |
| 5,490,645 A | | 2/1996 | Woodhouse |

(Continued)

FOREIGN PATENT DOCUMENTS

JP         63216270 A    *    9/1988

(Continued)

OTHER PUBLICATIONS

"Fuel Cell" Wikipedia, the Free Encyclopedia, Nov. 30, 2004 http://web.archive.org/web/20041130011826/http://en.wikipedia.org/wiki/Fuel_cell.*

(Continued)

*Primary Examiner*—Michael R. Mansen
*Assistant Examiner*—Joseph W Sanderson
(74) *Attorney, Agent, or Firm*—Lee & Hayes, PLLC

(57) ABSTRACT

Combined aircraft hybrid fuel cell auxiliary power unit and environmental control system and methods are disclosed. In one embodiment, an auxiliary power unit includes a fuel cell component which chemically converts combustible fuel into electrical energy. Unutilized fuel emitted by the fuel cell component is combusted by a burner to generate heated gas. The heated gas is received by and drives a turbine, which in turn drives a drive shaft. A compressor, coupled to the drive shaft, compresses a source of oxidizing gas for supplying compressed oxidizing gas to the fuel cell component and to an environmental control system. A heat exchanger controls the temperature of the pressurized air leaving the environmental control system to provide the cabin air supply. Finally, a generator is coupled to the drive shaft to be driven by the turbines to generate additional electrical energy.

14 Claims, 4 Drawing Sheets

U.S. PATENT DOCUMENTS

| | | | |
|---|---|---|---|
| 5,813,630 A | 9/1998 | Williams | |
| 5,948,221 A * | 9/1999 | Hsu | 204/270 |
| 5,967,461 A | 10/1999 | Farrington | |
| 5,968,680 A * | 10/1999 | Wolfe et al. | 429/13 |
| 6,190,791 B1 * | 2/2001 | Hornburg | 429/17 |
| 6,296,957 B1 | 10/2001 | Graage | |
| 6,365,290 B1 * | 4/2002 | Ghezel-Ayagh et al. | 429/20 |
| 6,450,447 B1 * | 9/2002 | Konrad et al. | 244/53 R |
| 6,607,854 B1 * | 8/2003 | Rehg et al. | 429/13 |
| 6,630,264 B2 * | 10/2003 | Haltiner et al. | 429/32 |
| 6,641,084 B1 * | 11/2003 | Huber et al. | 244/48 |
| 6,704,625 B2 | 3/2004 | Albero et al. | |
| 6,796,131 B2 * | 9/2004 | Sampson | 62/87 |
| 6,815,102 B2 * | 11/2004 | Bowman et al. | 429/13 |
| 6,834,831 B2 * | 12/2004 | Daggett | 244/58 |
| 6,857,602 B1 | 2/2005 | Grosskrueger et al. | |
| 7,118,818 B2 * | 10/2006 | Agnew et al. | 429/17 |
| 7,150,143 B2 * | 12/2006 | Schick et al. | 60/39.38 |
| 2002/0114985 A1 * | 8/2002 | Shkolnik et al. | 429/20 |
| 2002/0119354 A1 | 8/2002 | O'Brien et al. | |
| 2004/0091764 A1 * | 5/2004 | Hsu et al. | 429/34 |
| 2004/0096719 A1 * | 5/2004 | Singh et al. | 429/30 |
| 2004/0219408 A1 | 11/2004 | Hesse | |
| 2004/0241513 A1 * | 12/2004 | Issacci et al. | 429/26 |
| 2005/0019626 A1 * | 1/2005 | Burch et al. | 429/19 |
| 2006/0057443 A1 * | 3/2006 | Cooper | 429/19 |

FOREIGN PATENT DOCUMENTS

| | | |
|---|---|---|
| JP | 2004168186 | 6/2004 |
| JP | 2004243829 | 9/2004 |
| JP | 2005073360 | 3/2005 |

OTHER PUBLICATIONS

"Fuselage." The American Heritage® Dictionary of the English Language. 2003. CredoReference. Aug. 3, 2007 <http://www.credoreference.com/entry/4090037>.*

PCT Partial Intl Search Report and Invitation to Pay Additional Fees for Application No. PCT/US2006/010710, dated Jan. 16, 2007, 7 pages.

* cited by examiner

COMBINED FUEL CELL AIRCRAFT AUXILIARY POWER UNIT AND ENVIRONMENTAL CONTROL SYSTEM

FIELD OF THE INVENTION

The present disclosure relates generally to power supplies, and more specifically to aircraft systems that generate both electrical and pneumatic power.

BACKGROUND OF THE INVENTION

Auxiliary power units (APUs) are used in the aircraft industry to provide auxiliary power to onboard systems. APU systems may include turbine, fuel cell, and hybrid systems. Turbine-driven APUs burn jet fuel to drive a turbine, which in turn drives a generator to produce electrical energy. Fuel cells chemically convert fuel into electrical energy. Hybrid APUs utilize both turbine and fuel cell methods in its production of power. Each type of APU may be used to power onboard systems while the aircraft is on the ground, as well as when the aircraft is in flight.

Disadvantages of turbine APUs, however, may include poor fuel efficiency and appreciable pollution to an airport environment. In the case of turbine APUs, the burning of fuel to drive the turbines leaves some jet fuel uncombusted and produces oxides of nitrogen (NOx) emissions. Fuel cell APUs offer lower emissions than turbine-driven APUs, and are more fuel efficient, but are heavy and tend to loose efficiency at high altitudes. Hybrid fuel cell APUs generally improve upon the efficiency of conventional turbine and fuel cell APUs and are lighter weight than pure fuel cell APUs, but provide only electrical power suitable for certain aircraft and not for others, including those that require compressed air to drive an environmental control system.

An environmental control system (ECS) provides an environment with conditioned cool or warm compressed air. The ECS is typically pneumatically powered by hot compressed air that is bled off the aircraft engine's compressor or turbine-powered APU compressor. Alternately, the ECS can incorporate motors that are electrically powered by the aircraft engine generator or APU generator However, an ECS will penalize engine performance because its energy source is derived directly from the main engine or APU, capturing a significant amount of power.

Thus, conventional ECS packs that are pneumatically driven by the airplane engine or APU tend to be light weight, but are relatively inefficient. An ECS pack that is electrically driven by the airplane engine generator or a (hybrid) Fuel Cell APU is more efficient but is heavy.

SUMMARY OF THE INVENTION

The present invention is directed to a combined fuel cell aircraft auxiliary power unit and environmental control system. Embodiments of the present invention may provide an efficient method for providing both electrical and pneumatic power, and may reduce the weight and associated cost of aircraft operations.

In one embodiment of the present invention, a system includes an auxiliary power unit having a hybrid solid oxide fuel cell component. The auxiliary power unit is coupled to an environmental control system, which is also coupled to a cabin. The environmental control system provides a pressurized flow of conditioned air to the cabin and to the fuel cell APU component.

BRIEF DESCRIPTION OF THE DRAWINGS

Preferred and alternative embodiments of the present invention are described in detail below with reference to the following drawings.

DETAILED DESCRIPTION

Combined fuel cell aircraft auxiliary power unit and environmental control systems and methods are disclosed. Many specific details of certain embodiments of the invention are set forth in the following description and in FIGS. 1 through 5 to provide a thorough understanding of such embodiments. One skilled in the art, however, will understand that the present invention may have additional embodiments, or that the present invention may be practiced without several of the details described in the following description.

In general, embodiments of the present invention may provide a desired quality of electrical and pneumatic power. In one embodiment, combustible fuel is chemically converted into electrical energy by providing a supply of compressed air. Combustible fuel and air not consumed by the chemical process is collected and burned to drive a first high temperature power recovery turbine which, in turn, drives a first compressor to supply the compressed air. Compressed air is supplemented and further utilized by a second compressor, which distributes the pressurized air to a heat exchanger. The heat exchanger returns a measure of the further compressed air to the fuel cell and routes another measure to a second low temperature expansion turbine to provide cabin air supply to the aircraft.

Figure 1:
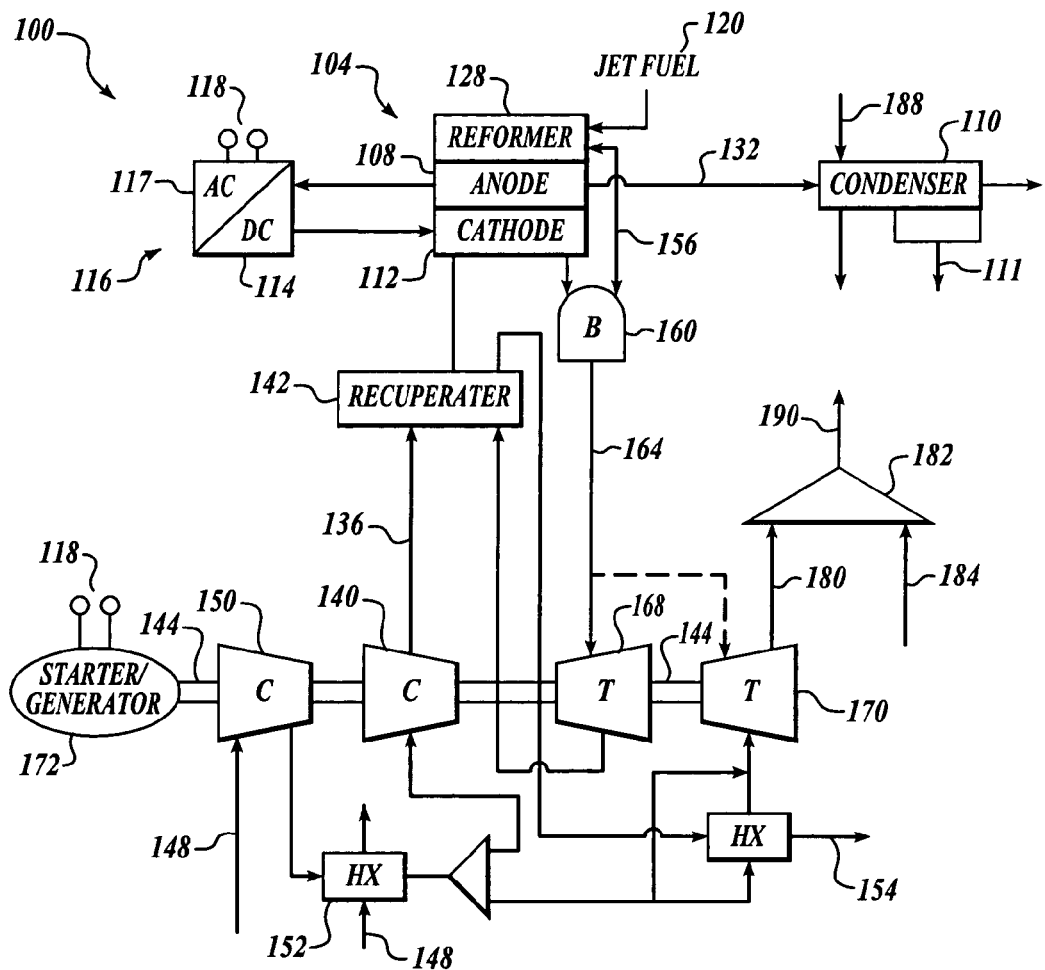
FIG. 1 is a block diagrammatic view of a combined hybrid fuel cell auxiliary power unit (APU) and environmental control system apparatus according to an embodiment of the present invention.

FIG. 1 is a block diagram of a combined fuel cell auxiliary power unit (APU) and environmental control system (ECS) 100 of the present invention. A fuel cell 104 comprises an anode portion 108 and a cathode portion 112 which together provide direct current (DC) power 114. The DC power 114 provided can, in turn, be supplied to an inverter 116 to provide alternating current (AC) power 117 to electrical systems 118. Thus, both DC power 114 and AC power 117 are provided by an embodiment of the present invention. In one present embodiment, the fuel cell 104 is a solid oxide fuel cell (SOFC). Although the present embodiment herein described refers to an aircraft application, embodiments of the present invention also could be used in other transportation systems, such as ships, tanks, military vehicles, trains, and other suitable systems. Alternative embodiments may also be used for ground-based power generating applications.

Referring back to FIG. 1, the fuel cell 104 receives a supply of jet fuel 120. The jet fuel supply 120 is routed through a reformer 128 to reform the jet fuel supply 120 into hydrogen and carbon monoxide (not shown) to be used by the fuel cell 104. The reformer 128 may be a steam reformer, a catalytic partial oxidation reformer, an autothermal reformer, or another similar type of reforming apparatus, which can convert fuel into the hydrogen and carbon monoxide reactants used by the fuel cell 104.

The fuel cell 104 also receives a supply of input gas 136, which, in some embodiments of the present invention, is a pressurized supply. In one embodiment, a compressor 140, driven by a drive shaft 144 through a process, which will be further described below, compresses the input gas supply to provide a denser and more oxygen component-rich input gas supply to the fuel cell 104. As previously mentioned, currently conceived fuel cells are less efficient at high altitudes. This inefficiency owes in part to low atmospheric pressure. Pressurizing the supply of input gas 136 improves efficiency of the chemical reactions in the fuel cell 104.

In the embodiment shown in FIG. 1, a raw gas input supply 148 into the system 100 (e.g. into a second compressor 150 or into a heat exchanger 152) suitably can be ambient outside air. In one embodiment, for example, the ambient pressure of the input gas 148 is increased from about 3.5 pounds per square inch (PSI) at a typical commercial airline cruising altitude of about 35,000 feet to about 10.9 PSI or more, that is a typical cabin pressure by the first compressor 150. Moreover, further compressing the gas 148 with a secondary compressor 140 after it has been compressed by the first compressor 150 may result in further expediting the chemical processes of the fuel cell 104.

In one embodiment of the present invention, the raw gas input supply 148 may pass through at least one heat exchanger 152 for distributing compressed air to the fuel cell 104 for chemically converting combustible fuel 120 into electrical energy 118 and to a second turbine 170, which expands air 180 to cabin pressure 182, lowering the temperature before mixing the air 180 with recycled cabin air 184 to produce a cabin air supply 190. In another embodiment, a compressed input gas supply 136 output by the second compressor 140 passes through a recuperator 142, which captures the air to be heated across a thermal gradient for circulation to the fuel cell 104 and to a second heat exchanger 154, which warms the flow using a hot exhaust 156 produced by the fuel cell 104 (e.g. by the cathode portion 112, the reformer 128, etc.) or using the heat lost from the fuel cell stack (not shown) itself. Increasing the temperature of the input gas supply 136 further enhances the chemical processes performed by the fuel cell 104 and reduces thermal gradients to the fuel cell stack.

In another embodiment of the invention as shown in FIG. 1, an exhaust 132 generated by the anode portion 108 of the fuel cell 104 and the exhaust 156 produced by the cathode portion 112 of the fuel cell are collected and combusted in a burner 160. The exhaust 132 of the anode portion 108 typically contains uncombusted fuel reformate, which was not entirely consumed by the chemical reactions within the fuel cell 104. Capturing and combusting this unutilized jet fuel in the burner 160 results in a pressurized heated gas stream 164 which can forcibly drive a first turbine 168. The first turbine 168 and the second turbine 170 are coupled to the drive shaft 144, driving that drive shaft 144 so that it can impart the mechanically-converted energy for other uses. One such use, as previously described, is turning the first compressor 150 and the second compressor 140 to pressurize the input gas supply 136 to the fuel cell 104.

Another possible use of the mechanical energy produced by the first turbine 168 and the second turbine 170 is the turning of a starter/generator 172, which is also coupled to the drive shaft 144. As part of its generator function, the starter generator 172 converts the mechanical energy manifested in rotation of the drive shaft into electric power, providing another source of electricity for aircraft systems. As shown in FIG. 1, the DC output 114 of the fuel cell 104 may be supplied to the inverter 116 to provide AC current 117 to the aircraft systems 118, and the inherently AC output of the starter/generator 172 is also shown as being provided directly to aircraft systems 118. However, in alternate embodiments, electric power output by the fuel cell 104 and/or the starter generator 172 can be divided, directed, and/or converted as needed to provide quantities of AC and DC electric power as desired for various aircraft systems.

Another function of the starter/generator 172 in one embodiment of the invention is as a starter. When the burner 160 is not burning collected uncombusted jet fuel from the fuel cell 104, there is no heated gas stream 164 to drive the turbine 168 to drive the drive shaft 144 to turn the compressor 140. Because a pressurized input gas supply 136 will enhance functioning of the fuel cell 104, the starter/generator 172 can be supplied with a source of electricity (not shown) to drive the drive shaft 144 to which it is coupled and, thus, turn the compressor 140 to create the pressurized input gas supply 136.

In another aspect, a condenser 110 provides a water supply 111. The condenser 110 receives hot exhaust 132 from the fuel cell 104. Using outside cooling air 188, the anode exhaust, which contains a water vapor mixture 132, is condensed to produce a water supply 111 that can be used by the reformer 128 or used by the aircraft system such that less water 111 need be stored onto the aircraft, thereby reducing the total weight of the aircraft system.

Figure 2:
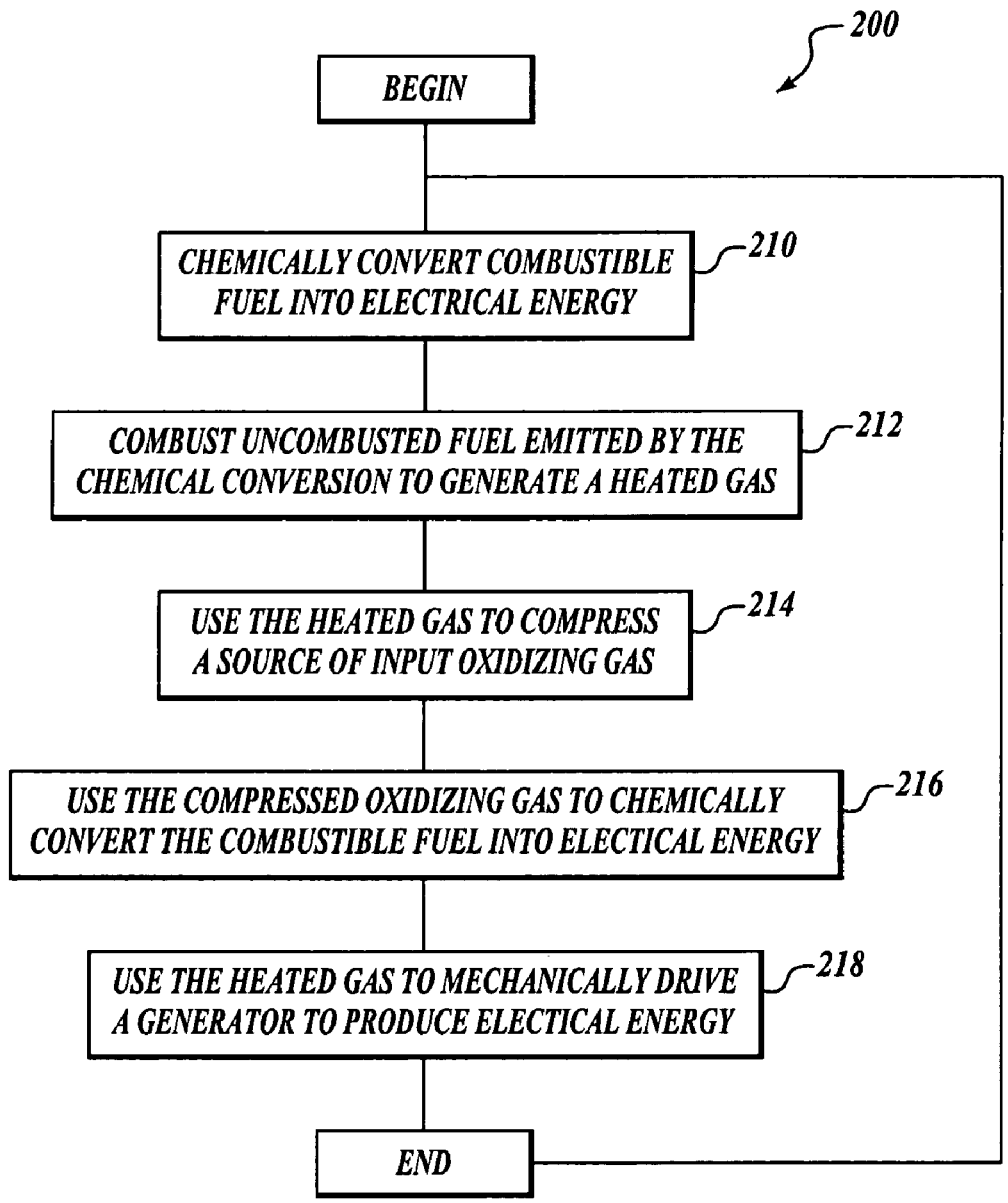
FIG. 2 is a block diagrammatic view of a method of generating electrical power, according to another embodiment of the present invention.

FIG. 2 is a flowchart illustrating a method 200 of generating electrical power. In this embodiment, at a block 210, combustible fuel is chemically converted into electrical energy, as might be performed by a fuel cell component. Examples of combustible fuel provided in this step may include reformed jet fuel and other suitable fuel types. As previously described, the chemical reformation of the combustible fuel may result in the formation of additional reactants, including hydrogen and carbon monoxide, which are used by the fuel cell component. At a block 212, fuel not consumed in the chemical conversion step at the block 210 is then combusted to generate a heated gas.

In another embodiment, heated gas generated at block 212 may be used to drive a turbine which drives a shaft which then drives a compressor to compress a source of input oxidizing gas at a block 214, increasing the energy content of the input gas. At a block 216, the compressed oxidizing gas is then used to further chemically convert the combustible fuel into electrical energy. In one embodiment, the heated gas is used at a block 218 to mechanically produce electricity by driving the starter/generator 172 (FIG. 1), as previously described. This process may repeat as desired.

Figure 3:
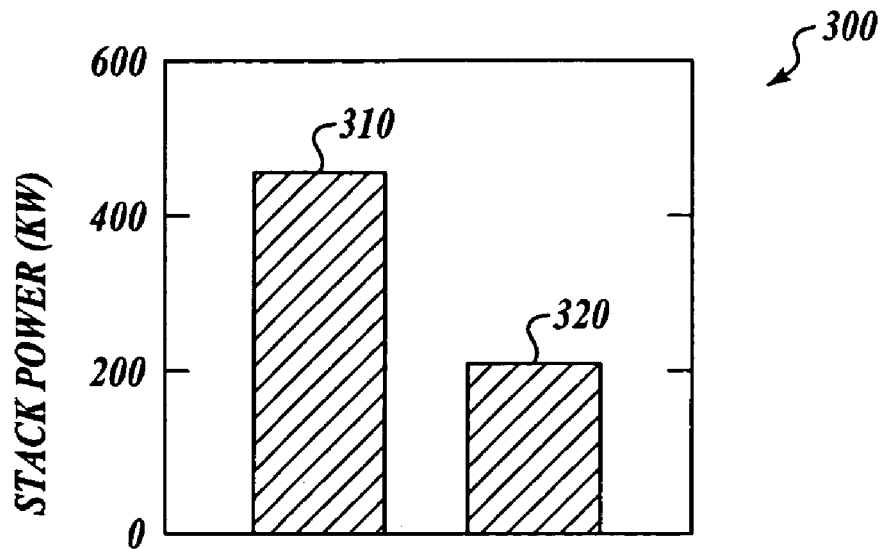
FIG. 3 is a bar chart graph illustrating relative fuel cell stack power according to yet another an embodiment of the present invention.

FIG. 3 is a bar chart graph 300 illustrating the fuel cell electrical power requirement effects of combining a fuel cell auxiliary power unit with an environmental control system as compared to having a separate fuel cell APU drive a separate environmental control system. As illustrated by graph 300, combining the fuel cell auxiliary power unit with an environmental control system may result in a first electrical power requirement 320 that is lower than a second electrical power requirement 310 from an independent fuel cell auxiliary power unit. In an uncombined system, an independent fuel cell system needs to produce enough electrical power to drive motors in the environmental control system. In a combined system, however, the addition of the environmental control system may decrease the amount of electrical energy needed to be produced by the fuel cell system, thereby enhancing the overall efficiency of the system. Accordingly, because an embodiment of the present invention may reduce fuel cell electrical power requirments, the present invention may provide increased energy efficiency to the power production of the aircraft system.

Additionally, the combined system of the present invention may also provide an effective method of producing conditioned, pressurized cabin air. In a typical uncombined fuel cell stack, most of the power produced by an independent fuel cell system is consumed by the environmental control system to pressurize and compress air for the cabin, resulting in the relatively high levels of fuel cell system power output, as described above. By combining the auxiliary power unit and environmental control system in the present invention, the fuel cell stack power output may be reduced, thereby pressurizing the cabin air at lower fuel cell system power levels without additional power penalty to the aircraft.

Figure 4:
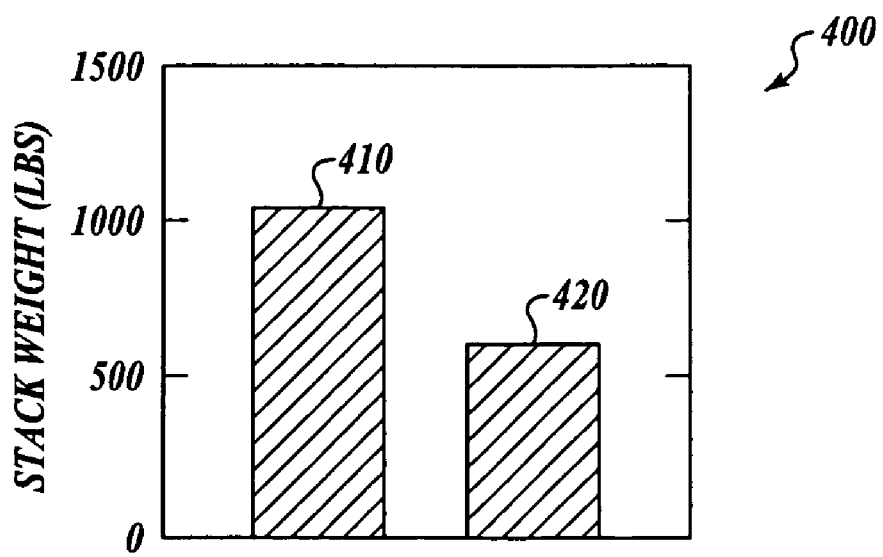
FIG. 4 is a bar chart graph illustrating the relative Solid Oxide Fuel Cell stack weight of the hybrid fuel cell APU according to a further embodiment of the present invention.

FIG. 4 is a bar chart graph 400 illustrating the effects of combining an auxiliary power unit with an environmental control unit on the general stack 104 in FIG. 1 weight of the apparatus. A standing weight of a fuel cell stack auxiliary power unit 410 is compared with a general stack weight of an embodiment of the present invention 420. Advantageously, the effective total mass for the fuel cell stack decreases with the addition of the air cycle unit because of the lower required fuel cell electrical power levels previously described. According to one embodiment of the present invention, the effective total mass of the fuel cell system weight decreases upon combining the auxiliary power unit with an environmental control unit. As described above, combining the two systems reduces the electrical energy output of the fuel cell stack. By reducing the amount of power generated by the cell stack, the stack can be produced in relatively smaller sizes. Consequently, its stack weight may be significantly reduced.

Figure 5:
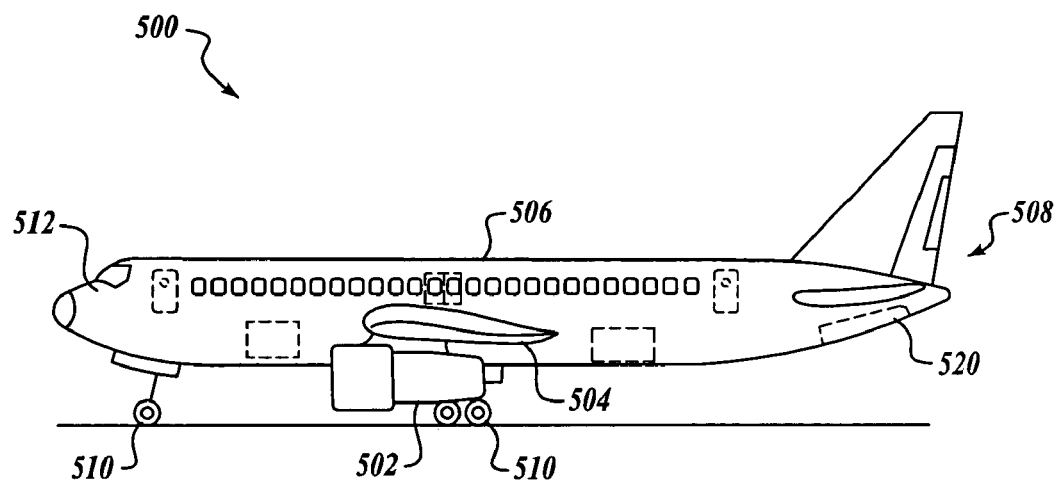
FIG. 5 is a side elevation view of an aircraft incorporating one or more components in accordance with an embodiment of the present invention.

Those skilled in the art will readily recognize that embodiments of the present invention may be used in a wide variety of components incorporated into a wide variety of different systems. For example, FIG. 5 shows a side elevation view of an aircraft 500 having one or more components 520 using methods in accordance with the present invention. The aircraft 500 generally includes one or more propulsion units 502 that are coupled to wing assemblies 504, or alternately, to a fuselage 506 or even other portions of the aircraft 500. Additionally, the aircraft 500 also includes a tail apparatus 508 and a landing apparatus 510 coupled to the fuselage 506. The aircraft 500 further includes other systems and subsystems generally required for the proper operation of the aircraft 500. For example, the aircraft 500 includes a flight control system 512 (not shown), as well as a plurality of other electrical, mechanical and electromechanical systems that cooperatively perform a variety of tasks necessary for the operation of the aircraft 500.

Although the aircraft 500 shown in FIG. 5 generally shows a commercial passenger aircraft, which may include, for example, the 737, 747, 757, 767 and 777 passenger aircraft commercially-available from The Boeing Company of Chicago, Ill., it should be understood that embodiments of the present invention may be used on a wide variety of flight vehicles. Examples of such flight vehicles may include manned or unmanned military aircraft, rotary wing aircraft, missiles, or ballistic flight vehicles, as illustrated more fully in various descriptive volumes, such as Jane's All The World's Aircraft, available from Jane's Information Group, Ltd. of Coulsdon, Surrey, UK. Further, alternative embodiments of the present invention include exterior and interior components of a given commercial passenger aircraft, as illustrated by FIG. 5.

Embodiments of the present invention may provide significant advantages over prior art power generating systems. For example, embodiments of the present invention may reduce or eliminate the utilization of electrically-driven compressor motors for ECS, thereby providing an efficient production of energy. Embodiments of the present invention also relieve the engines from air bleed for cabin pressurization and power take-off to drive the engine generators, as well as reduce the fuel used by the system. Furthermore, because embodiments of the present invention are capable of being applied to a variety of applications, such embodiments are suitable for use in association with multiple functions.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A system for providing electrical power and a breathable airflow into a compartment, comprising:
   a fuel cell component coupled to a fuel supply and to a first pressurized flow of air, the fuel cell component being configured to provide an electrical output and a combustible exhaust flow;
   a burner coupled to receive the exhaust flow from the fuel cell component and disconnected from the fuel supply, the burner being configured to provide a hot gas outflow;
   a turbine configured to be driven by the hot gas outflow from the burner; and
   at least one compressor mechanically driven by the turbine, the at least one compressor being configured to receive an inflow of air and to provide the first pressurized flow of air to the fuel cell component and to provide a second pressurized flow of air, the second pressurized flow of air being suitable to provide the breathable airflow into the compartment, wherein the at least one compressor includes a first compressor configured to provide the second pressurized flow of air, and a second compressor configured to provide the first pressurized flow of air to the fuel cell component.

2. The system of claim 1, wherein the fuel cell component is configured to convert a portion of a combustible fuel into electrical energy, and emit a portion of the combustible fuel as unconsumed combustible exhaust.

3. The system of claim 2, wherein the fuel cell component comprises a solid oxide fuel cell and the combustible fuel comprises jet fuel, and wherein the fuel cell component is further configured to emit a portion of the jet fuel as unconsumed combustible exhaust.

4. The system of claim 1, further comprising at least one heat exchanger configured to transfer heat from the hot gas outflow from the burner to the second pressurized flow of air.

5. The system of claim 1, wherein a portion of a pressurized airflow output by the first compressor is received by the second compressor.

6. The system of claim 1, wherein the fuel cell component includes a reformer configured to receive and convert combustible fuel into reactants, including at least one of hydrogen and carbon monoxide.

7. The system of claim 1, further comprising a recuperator coupled between the at least one compressor and the fuel cell component, the recuperator being configured to condition the first pressurized flow of air to reduce thermal gradients across the fuel cell component.

8. The system of claim 1, further comprising a condenser configured to recover water vapor generated by the fuel cell component.

9. The system of claim 8, further comprising a reformer coupled to the fuel cell component, and wherein the condenser is further configured to supply water vapor to the reformer.

10. The system of claim 1, further comprising a starter-generator operatively coupled to the turbine and configured to at least one of generate electrical energy and drive a drive shaft.

11. An aerospace vehicle, comprising:
   a fuselage having an interior compartment and a storage portion configured to store a fuel supply;
   a lift producing surface operatively coupled to the fuselage;
   at least one engine operatively coupled to the fuselage; and
      a hybrid system for providing an electrical output and a breathable airflow into the interior compartment, the system including: a fuel cell component coupled to the fuel supply and to a first pressurized flow of air, the fuel cell component being configured to provide at least a portion of the electrical output and a combustible exhaust flow;
      a burner coupled to receive the exhaust flow from the fuel cell component and disconnected from the fuel supply, the burner being configured to provide a hot gas outflow;
      a turbine configured to be driven by the hot gas outflow from the burner; and
      at least one compressor mechanically driven by the turbine, the at least one compressor being configured to receive an inflow of air and to provide the first pressurized flow of air to the fuel cell component and to provide a second pressurized flow of air, the second pressurized flow of air being suitable to provide at least part of the breathable airflow into the interior compartment; and
      at least one heat exchanger configured to transfer heat from the hot gas outflow from the burner to the second pressurized flow of air.

12. The aerospace vehicle of claim 11, wherein the at least one compressor includes a first compressor configured to provide the second pressurized flow of air, and a second compressor configured to provide the first pressurized flow of air to the fuel cell component.

13. The aerospace vehicle of claim 11, wherein the fuel cell component includes a reformer configured to receive and convert combustible fuel into reactants, including at least one of hydrogen and carbon monoxide.

14. The aerospace vehicle of claim 11, further comprising a recuperator coupled between the at least one compressor and the fuel cell component, the recuperator being configured to condition the first pressurized flow of air to reduce thermal gradients across the fuel cell component.

* * * * *